United States Patent [19]

Yoshida

[11] Patent Number: 5,036,358

[45] Date of Patent: Jul. 30, 1991

[54] IMAGE-FORMING APPARATUS AND A METHOD FOR A DETECTING DEVELOPER AMOUNT THEREIN

[75] Inventor: Narutaka Yoshida, Osaka, Japan

[73] Assignee: Minolta Camera Kabushiki Kaisha, Osaka, Japan

[21] Appl. No.: 476,686

[22] Filed: Feb. 8, 1990

[30] Foreign Application Priority Data

Feb. 10, 1989 [JP] Japan .................................. 1-31823

[51] Int. Cl.[5] ...................... F03G 15/08; G03G 21/00

[52] U.S. Cl. .................................. 355/203; 355/245; 118/694; 340/617

[58] Field of Search ............................... 355/203-206, 355/245, 246, 298; 118/691, 694; 222/64, DIG. 1; 340/617

[56] References Cited

U.S. PATENT DOCUMENTS

| | | | |
|---|---|---|---|
| 4,506,804 | 3/1985 | Oka | 222/64 |
| 4,646,679 | 3/1987 | Ohno et al. | 118/691 |
| 4,791,454 | 12/1988 | Takahashi et al. | 355/299 |
| 4,963,929 | 10/1990 | Ueda et al. | 355/215 |

FOREIGN PATENT DOCUMENTS

| | | | |
|---|---|---|---|
| 59-46391 | 11/1984 | Japan . | |
| 60-80879 | 5/1985 | Japan | 355/246 |
| 60-128469 | 7/1985 | Japan . | |
| 61-109080 | 5/1986 | Japan | 355/246 |
| 1-6986 | 1/1989 | Japan | 355/245 |

*Primary Examiner*—Joan H. Pendegrass

*Attorney, Agent, or Firm*—Burns, Doane, Swecker & Mathis

[57] ABSTRACT

An image-forming apparatus includes: a photosensitive member; a developing device; a developer accommodating device for accommodating the developer to be supplied to the developing device, the accommodating device having a housing of which a first and second windows made of transparent members are arranged at a ceiling and a bottom; a cleaning device for periodically cleaning the first and second windows; and a detecting device having a light emitting device arranged outside the housing and confronting with one of the windows, and a light receiving device arranged outside the housing and confronting with the other of the windows. Light emitted from the light emitting device is illuminated through the light emitting device. The light receiving device receives the light emitted from the light emitting device to detect an amount of the developer in the housing. A method for detecting an amount of developer in the developing device, includes the steps of: cleaning the first and second windows periodically; emitting light through one of the windows into the housing; receiving the emitted light through the other of the windows; and detecting the amount of the developer in the housing according to a light receiving amount.

12 Claims, 10 Drawing Sheets

IMAGE-FORMING APPARATUS AND A METHOD FOR A DETECTING DEVELOPER AMOUNT THEREIN

BACKGROUND OF THE INVENTION

The present invention relates to an image-forming apparatus such as a copy apparatus or a printer and to a method for detecting a developer amount therein.

Generally, in an image-forming apparatus using an electrophotography method, a toner replenishing unit is attached to a developing device thereof to replenish into the developing device an amount of toner correspondent to the amount of toner consumed in developing, and a toner detecting means is arranged at the toner replenishing unit to detect a toner empty state in the unit.

In the construction, the toner empty state is detected to inform a timing for replenishing toner. Therefore, generally, the detecting means detects a toner complete empty state where toner completely is not left in the unit, but a state where some of toner are left in the unit, that is, a so-called near empty state. Therefore, in the near empty state detected, a considerable amount of the toner is left in the unit. See Japanese Laid-open Patent Publication No. 60-128469.

There is such a type of copy apparatus that the developing device is detachably arranged at the body of the copy apparatus and the device attached to the body is removed therefrom to discard the device when the toner therein is consumed and instead of it, to attach a new developing device filled with toner to the body. In the apparatus, however, it is desired that the detecting means detects a state where the unit is more completely emptied.

Japanese Examined Patent Publication No. 59-46391 discloses that a toner empty detecting sensor is arranged at the bottom of a toner hopper to detect an approximately toner complete empty state. In this method, however, for example, when toner is offset in the hopper or when toner is formed in a bridge configuration at the detecting portion in the hopper, it is possible that the empty state is detected by the sensor by mistake though the toner is left in the housing.

SUMMARY OF THE INVENTION

Accordingly, an essential object of the present invention is to provide an image-forming apparatus and a method for detecting a developer amount therein which comply with the desire, resolve such a disadvantage, and have a developer empty detecting means neither whole nor a part of which is arranged at a developing device for discarding and by which a developer empty state where developer is completely consumed in a developer accommodating means can be detected.

In accomplishing these and other objects, according to one preferred embodiment of the present invention, there is provided an image-forming apparatus including: a photosensitive member; a developing means for supplying developer on an electrostatic latent image on said member to develop it; a developer accommodating means for accommodating the developer to be supplied to said developing means, said accommodating means having a housing of which a first and second windows made of transparent members are arranged at a ceiling and a bottom; a cleaning means for periodically cleaning the first and second windows; and a detecting means having a light emitting means arranged outside the housing and confronting with one of the windows, through which light emitted from the light emitting means is illuminated, and a light receiving means arranged outside the housing and confronting with the other of the windows, which receives the light emitted from the light emitting means to detect an amount of the developer in the housing.

In another aspect of the present invention, there is provided a method for detecting an amount of developer in a developing means for supplying the developer on an electrostatic latent image on a photosensitive member for development, the developing means having a housing for accommodating the developer of which a first and second windows made of transparent members are arranged at a ceiling and a bottom, the method including the steps of: cleaning the first and second windows periodically; emitting light through one of the windows into the housing; receiving the emitted light through the other of the windows; and detecting the amount of the developer in the housing according to a light receiving amount.

By the above construction of the present invention, since the light emitting means is arranged at a position where light emitted from the light emitting means is received by the light receiving means through the windows, the detecting means can detect only such a developer empty state that the developer is approximately completely empty in the developer accommodating means. Since it is unnecessary that the detecting means for detecting developer is arranged at the developer accommodating means, the image-forming unit can be simpler in construction and cheaper in manufacturing cost. The developer in the developer accommodating means is always agitated by the cleaning means and the windows are approximately simultaneously cleaned by the cleaning means in correspondence with the movement of the developer. Therefore, the light receiving means can certainly receive the light emitted from the light emitting means. When the cleaning means is attached to the agitating means, the developer in the developer accommodating means can be uniformly agitated to prevent from causing the mistake.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE EMBODIMENTS

Figure 1:
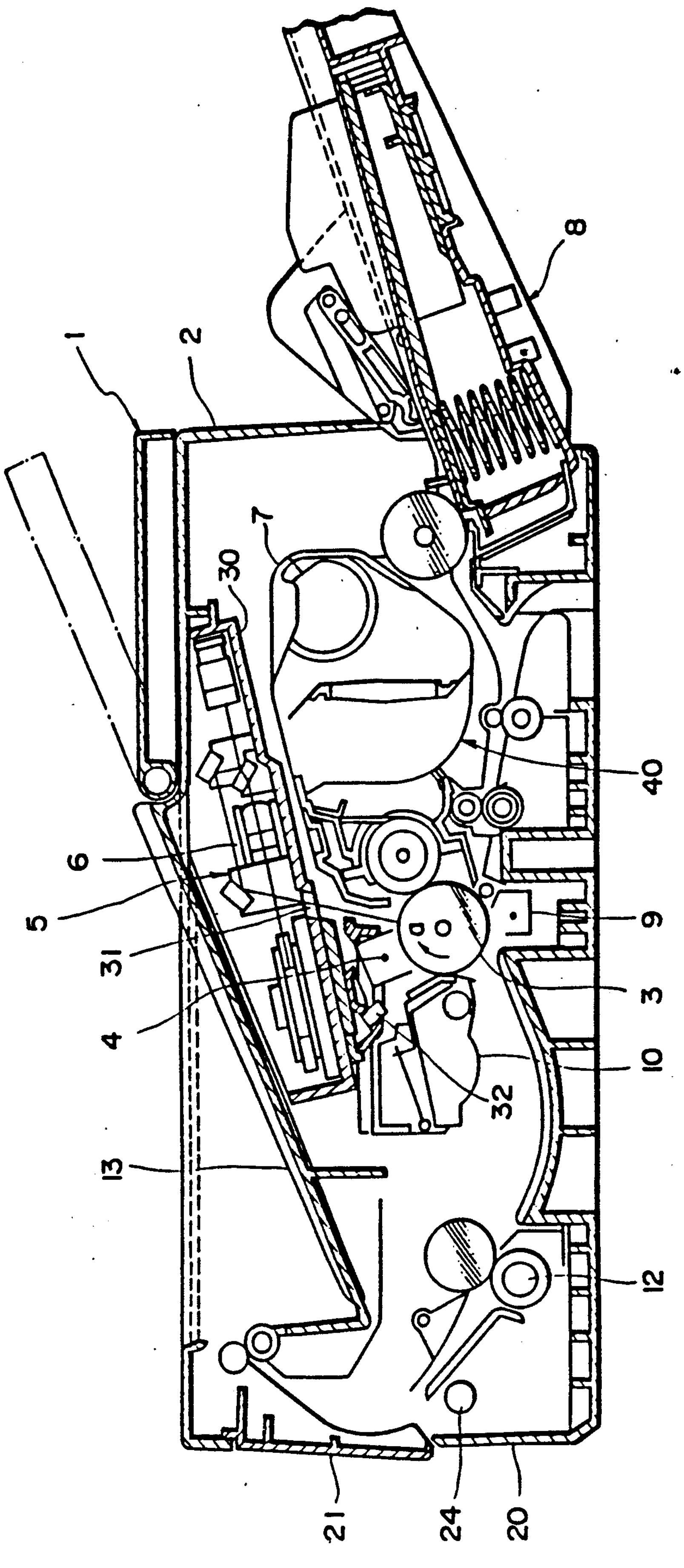
FIG. 1 is a sectional view of a printer of a preferred embodiment according to the present invention.

Before the description of the present invention proceeds, it is to be noted that like parts are designated by like reference numerals throughout the accompanying drawings.

FIG. 1 shows a printer 1 which construction will be described hereinbelow.

Figure 2:
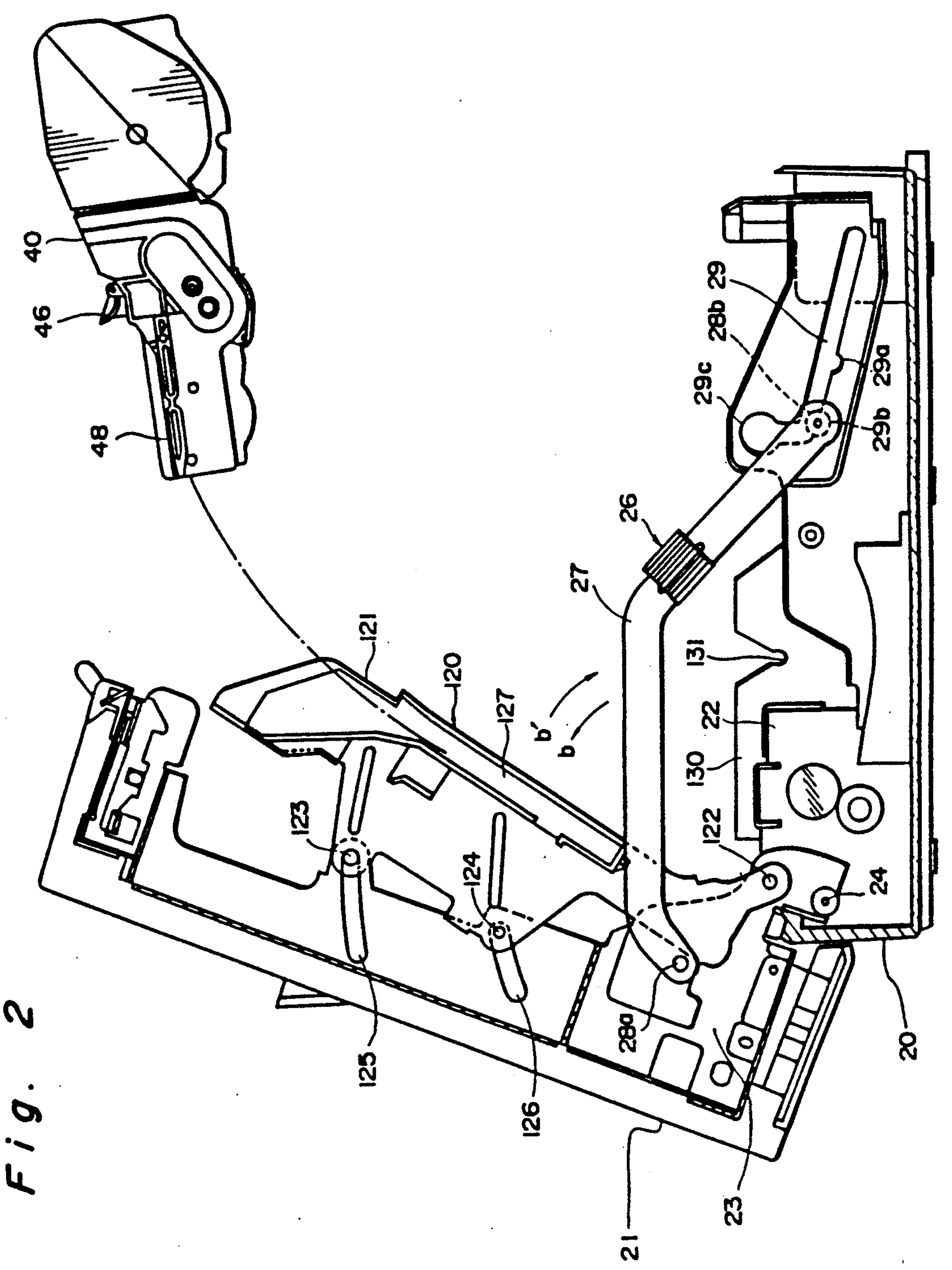
FIG. 2 is a sectional view of the printer in a state where an upper unit thereof is opened with respect to a lower unit thereof.

A. body 2 (referring to FIGS. 1 and 2)

A body 2 of the printer 1 is divided into two parts, a lower unit 20 and an upper unit 21. The unit 20 has a side frame 22 at both the sides thereof and the unit 21 has a side frame 23 at both the sides thereof. The side frames 22 and 23 are rotatably connected with each other through a shaft 24 to rotate the upper unit 21 with respect to the lower unit 20 in directions shown by arrows (b) and (b') for opening and closing.

The upper unit 21 is urged in the direction shown by the arrow (b) for opening thereof by a spring (not shown) and is held in an open state by an open holding mechanism 26.

In the mechanism 26, an arm 27 is rotatably attached to the side frame 23 of the upper unit 21 with a pin 28*a*. A pin 28*b* arranged at the free end of the arm 27 is inserted into a guide groove 29 arranged at the side frame 22 of the lower unit 21. The groove 29 has engaging portions 29*a*, 29*b*, and 29*c*. According to the opening and closing operations of the upper unit 21, the pin 28*b* is moved in the groove 29. By engaging the pin 28*b* with one of the engaging portions 29*a*, 29*b*, and 29*c*, the upper unit 21 is held in the opening state at a specified angle predetermined with respect to the engaging portion with which the pin 28*b* is engaged.

Figure 3:
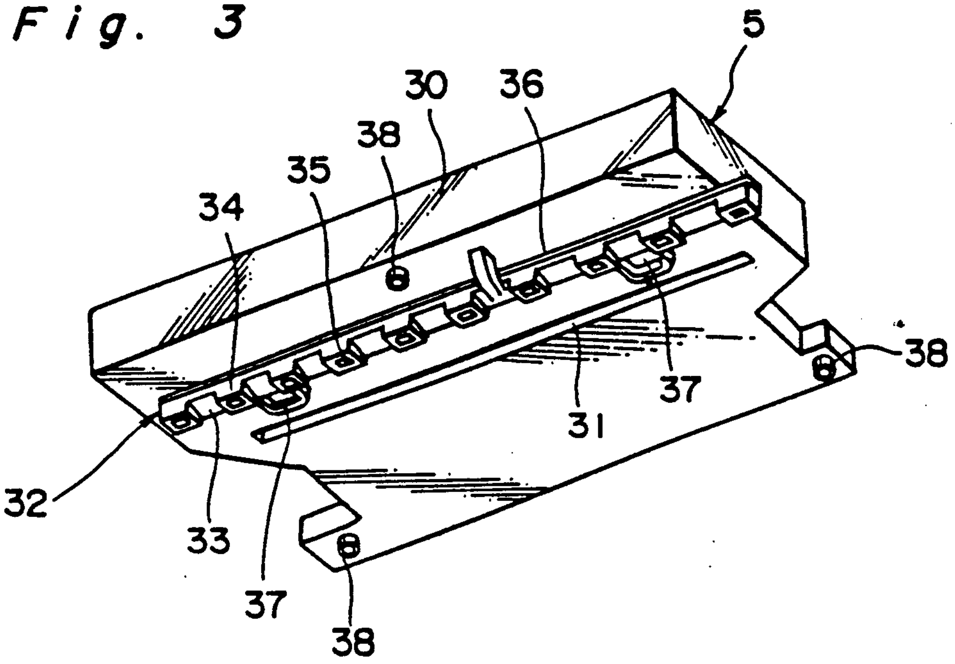
FIG. 3 is a perspective view of an optical unit of the embodiment showing from the underside thereof.

B. optical unit 5 (referring to FIGS. 1 and 3)

An optical unit 5 has a box-type housing 30 which is opened upward. In the housing 30, a laser light source, a polygonal mirror, a toroidal lens, a Half-mirror, a spherical mirror, a mirror, a reflector etc. are arranged. An exposure slit 31 is formed at the bottom of the housing 30.

An eraser 32 is arranged at the bottom of the housing 30. The eraser 32 is so constructed that lamps, light emitting diodes, 35 are arranged at plural base portions 34 arranged at a bed plate 33, and is fixed through a base plate 36 to the bottom surface of the housing 30 with attaching portions 37 thereof.

The optical unit 5 having the above construction is fixed to the upper unit 21 with plural bolts 38.

C. image-forming unit (imaging unit) 40

An image-forming unit 40 is so constructed that a photosensitive drum 3, a charger 4, a developing device 7, and a cleaning device 10 are integrally arranged at a unit body 41.

(i) unit body 41 (referring to FIGS. 4–7)

The unit body 41 is constructed by an upper frame 42 and side frames 43 elongated downward from both the sides of the upper frame 42. At the upper frame 42, a charger-attaching portion 44, an exposure slit 45, and eraser insert holes 47 are provided. The exposure slit 45 is able to be opened and closed by a cover 46. At the outer surfaces of the side frames 43, guides 48 and recesses 50 (one of the recesses 50 is not shown) are formed confronting with each other respectively. Each recess 50 has holes 51 and 52 connecting between the inside and the outside thereof.

(ii) charger 4 (referring to FIGS. 8–12)

The charger 4 has a small holder 61 and a big holder 62, which are made of insulating material, at both the ends of a stabilizer 60 having generally U-like cross-section. The big holder 62 is elongated in a direction perpendicularly intersecting to the longitudinal direction of the stabilizer 60. In the big holder 62, two conductive flat springs 63 and 64 are arranged in the direction perpendicularly intersecting to the longitudinal direction of the stabilizer 60. The one ends of the springs 63 and 64 are supported by support portions 62*a* and 62*b* of the big holder 62 which are on the opposite end to the stabilizer 60. The free ends of the springs 63 and 64 are located at a confronting position 62*c* confronting with the stabilizer 60. Contacts 65 and 66 are arranged at the fixed ends of the springs 63 and 64 to protrude therefrom at the left side of the big holder 62 in FIG. 8.

A charge wire 67 is arranged at approximately the middle of the stabilizer 60. The one end of the wire 67 is engaged with a projection 68 of the small holder 61 and the other end thereof is engaged with the free end of the spring 63, so that the wire 67 is tensioned by the restoring force of the spring 63.

A mesh 69 is arranged at the opening of the stabilizer 60. The one end of the mesh 69 is engaged with a projection 70 of the small holder 61 and the other end thereof is engaged with the free end of the spring 64, so that the mesh 69 is tensioned by the restoring force of the spring 64.

The charger 4 having the above-described construction is positioned in a manner described hereinbelow. The stabilizer 60, the small holder 61, and the big holder 62 are fitted into the charger attaching portion 44 of the unit body 41; projections 71 and 72 respectively arranged at the small holder 61 and the big holder 62 are fitted into recesses 73 and 74 of the unit body 41 to prevent the charger 4 from rotating; and positioning pins 79 are respectively inserted into the unit body 41 and the small holder 61 and into the unit body 41 and the big holder 62. In this positioning operation, the charger 4 is fixed to the charger attaching portion 44 by the pins 79 so that the charger 4 is permitted to move in the longitudinal direction thereof. Therefore, this permitted movement can prevent that any overload is forcedly applied to the charger 4 and the unit body 41 by heat deformation thereof. Engaging portions 75 and 76 arranged at the big holder 62 are fitted into engaging holes 77 and 78 of the unit body 41 to prevent them from dropping.

(iii) developing device 7 (referring to FIGS. 4–7)

The developing device 7 is constructed by a developing unit 80 and a hopper unit 95.

A housing 81 of the developing unit 80 is generally formed in an approximately square, and a driving roller 82, serving as a developing roller, is arranged along the opening of a front portion 81*a* of the housing 81.

The roller 82 is constructed so that a sleeve 84 made of rubber etc. is covered a mandrel 83, and a gear 86 is attached to the one end of the roller 82. Both the ends of a support shaft 85 of the roller 82 are inserted into grooves 81*c* formed at both the side walls of the housing 81 to support the roller 82 by bearings 87 fitted into the grooves 81*c*.

The roller 82 has a thin film member 88 covered the circumferential surface of the sleeve 84. A sheet made of synthetic resin such as polyamide or polyester, a thin film made of metal such as nickel or chrome, or a sheet which is constructed so that the synthetic resin sheet is laminated over the outer surface of the metal thin film can be used as the thin film member 88. At least a part of the surface of the member 88 is roughened and the circumferential length of the member 88 is a little longer than that of the sleeve 84.

A wall 89 confronting with and spaced from the circumferential surface of both the ends of the roller 82 at specific intervals is formed on the inside of the housing 81. An elastic member 90 is arranged between the wall 89 and the thin film member 88. The thin film member 88 is closely contacted with the circumferential surface of the rear of the driving roller 82. At the front of the driving roller 82, a space 91 is formed between the roller 82 and the member 88. At the bottom of the housing 81, a synthetic resin sheet (not shown) is attached and the free-end-side thereof is contacted with the member 88 under pressure. A contact 88*a* is arranged at the one end of the housing 81 and the one end thereof contacts with the member 88. A regulating plate 92 is attached to the ceiling of the housing 81 and the free end of the plate 92 contacts with the circumferential surface of the rear 81*b* of the member 88 under pressure. An agitating blade 93 is arranged in parallel with the driving roller 82 at the rear 81*b* of the housing 81.

Figure 13:
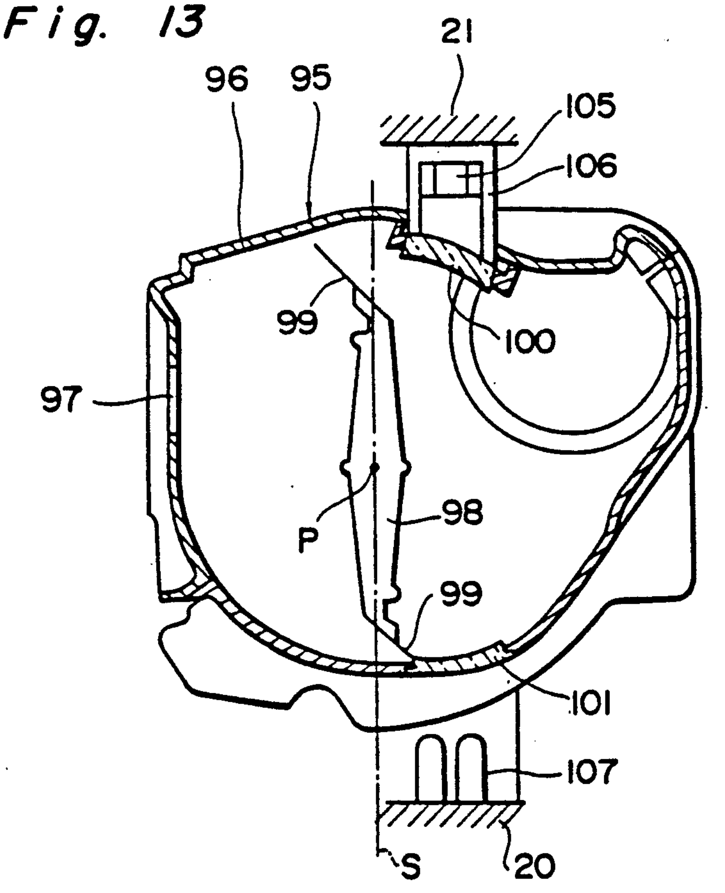
FIG. 13 is a sectional view of a hopper unit of the embodiment.

A hopper 96 of the hopper unit 95 has an opening 97 connecting between the inside and the outside thereof the front 96*a* of the hopper 96. An agitating blade 98 is rotatably arranged in the hopper 96 and has clean members 99 comprised of a film sheet made of polyester etc. at both the distal ends thereof. As shown in FIG. 13, light transmission portions 100 and 101 made of transparent material are arranged at the ceiling and the bottom of the hopper 96 and in the vicinity of a center line (S) in a vertical direction passing a rotary center (P) of the agitating blade 98. The inner surfaces of the portions 100 and 101 are cleaned by the clean members 99 according to rotation of the blade 98. The inner surfaces of the portions 100 and 101 are arranged along the moving locus of the clean members 99 to clean uniformly.

The front of the hopper unit 95 is fitted into the rear of the developing unit 80 and these contact surfaces of them are adhered by adhesive so as to connect the developing unit 80 with the hopper unit 95 to form a unit. The developing unit 80 and the hopper unit 95 are connected with each other to form a buffer space 102 therebetween.

Figure 14:
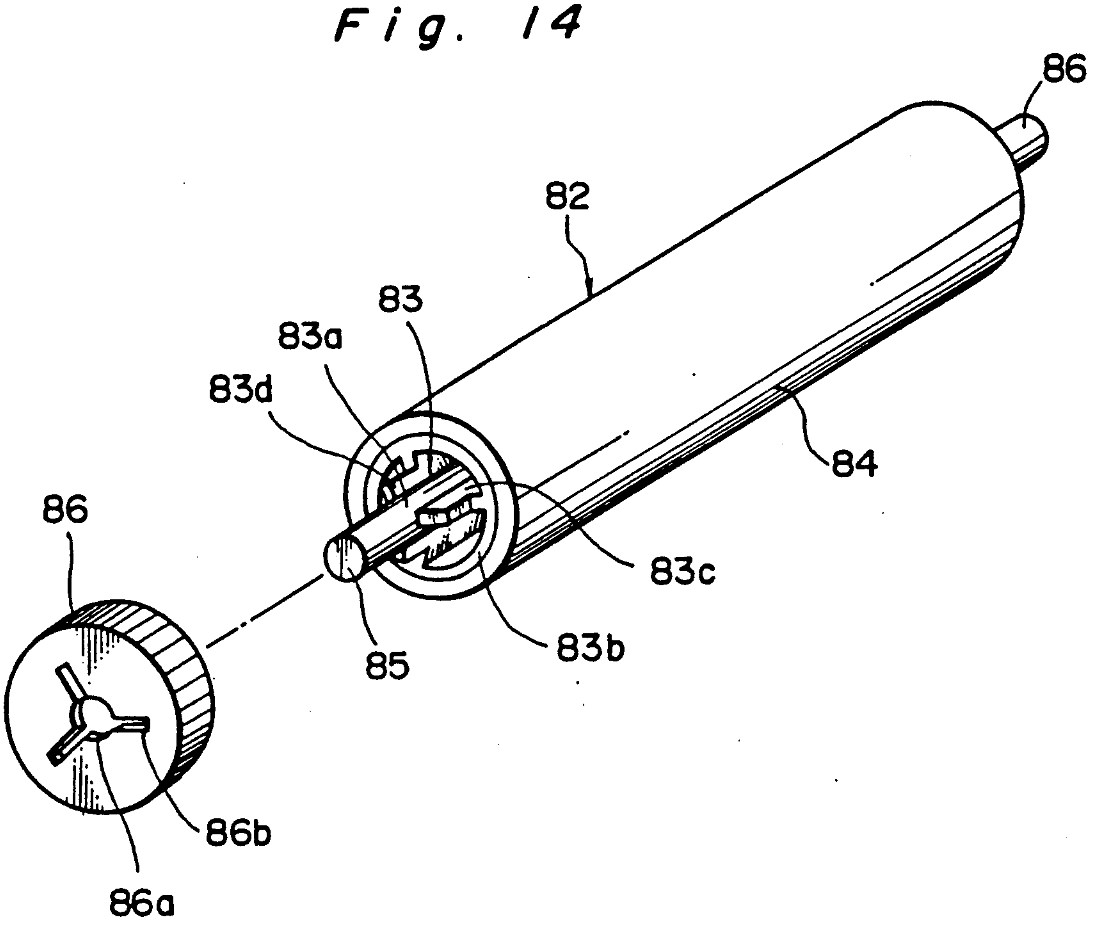
FIG. 14 is an exploded perspective view of a driving roller of the embodiment.

The driving roller 82 will be explained hereinbelow referring to FIG. 14. The mandrel 83 of the driving roller 82 includes a shaft portion 83*a*, a pipe 83*b* surrounding the shaft portion 83*a*, and plural ribs 83*c* by which the shaft portion 83*a* is connected with the pipe 83*b*. The mandrel 83 is formed as a unit by drawing molding or extrusion molding and thereafter the pipe 83*b* and parts of the ribs 83*c* in an area predetermined from the end surface of the one end of the mandrel 83 are cut by lathe processing so that the shaft portion 83*a* and the remainder of the ribs 83*c*, that is, engaging portions, 83*d* are protruded from the pipe 83*b*. The pipe 83*b* and all the ribs 83*c* in an area predetermined from the end surface of the other end thereof are cut so that only the shaft portion 83*b* is protruded from the pipe 83*b*. As a result, the shaft portion 83*a* protruding from the pipe 83*b* is served as the support shaft 85.

A through hole 86*a* is formed at the center of the gear 86 and plural slits 86*b* are radially formed around the hole 86*a*.

The end of the support shaft 85 of the mandrel 83 of the driving roller 82 is inserted into the hole 86*a* of the gear 86 and the engaging portions 83*d* protruded form the pipe 83*b* are fitted into the slits 86*b* so that the gear 6 can not relatively rotate with respect to the mandrel 83.

Figure 15:
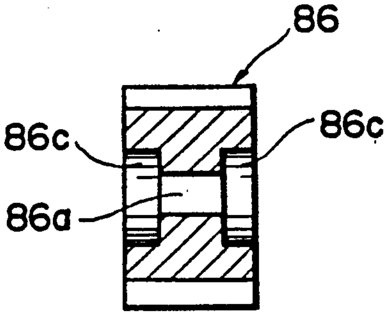
FIG. 15 is a sectional view of a gear of the embodiment.

As shown in FIG. 15, the gear 86 can have slits 86*c* at both sides thereof symmerically. In this case, both the ends of the support shaft 85 can be inserted into the hole 86*a* of the gear 86, with the result that it is unnecessary to judge both sides of the gear 86 so as to be capable of inserting the support shaft 85 thereinto, particularly in automatic assembly process.

The developing device 7 having the above-described construction is fixed to the unit body 41 by bolts 108 after attaching thereto. The support shaft 85 of the driving roller 82 is held in a state confronting with the hole 51 of the side frame 43.

Figure 6:
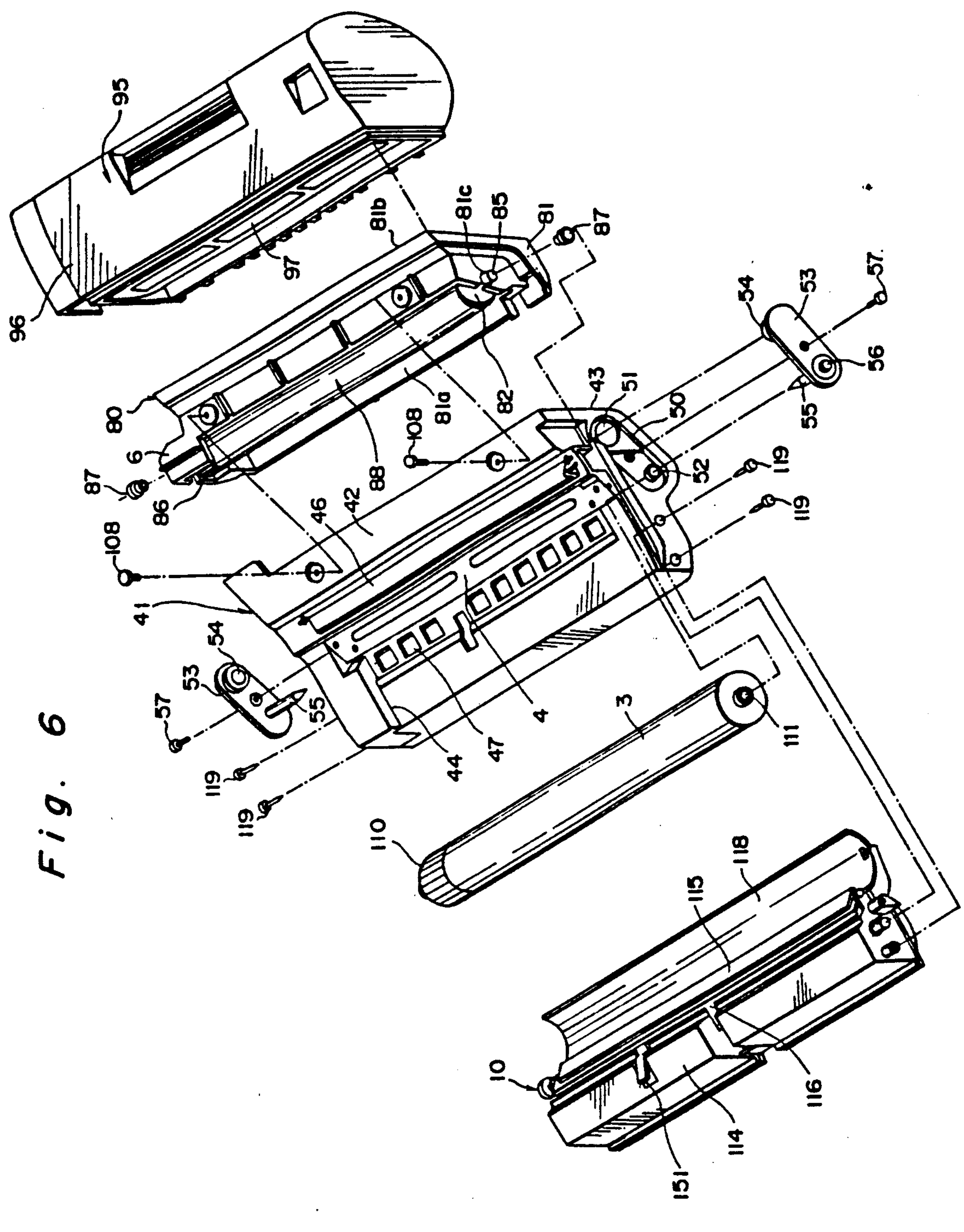
FIG. 6 is an exploded perspective view of the image-forming unit.

(iv) photosensitive drum 3 (referring to FIG. 6)

The drum 3 is formed so that a photosensitive layer is formed over the circumferential surface of a cylinder element made of material such as aluminum and a gear 110 is attached to the one end of the drum 3.

The drum 3 is arranged inside the unit body 41 while confronting with the driving roller 82 and is fixed to the unit body 41 by holding members 53 for positioning the photosensitive member 3 and the driving roller 82.

Each of the holding members 53 has a plate member with the same shaped as the recess 50 of the side frame 43 of the unit body 41, a support shaft 55 penetrating one end of the plate member, and a bearing 54 arranged at the other end of the plate member. The holding members 53 rotatably support the drum 3 while the bearing 54 and the support shaft 55 are inserted into the holes 51 and 52 respectively and each support shaft 55 is inserted into each bearing hole 111 of the drum 3. At the same time, the bearings 54 are attached on both the ends of the support shaft 85 of the driving roller 82 to support the driving roller 82 rotatably by the holding members 53. The holding members 53 are fitted into and fixed to the recesses 50 by bolts 57.

The drum 3 and the driving roller 82 are respectively supported by the support shafts 55 and the bearings 54 of the holding members 53 having the same shape each other, with the result that the distance between the drum 3 and the roller 82 is maintained constant axially.

Figure 4:
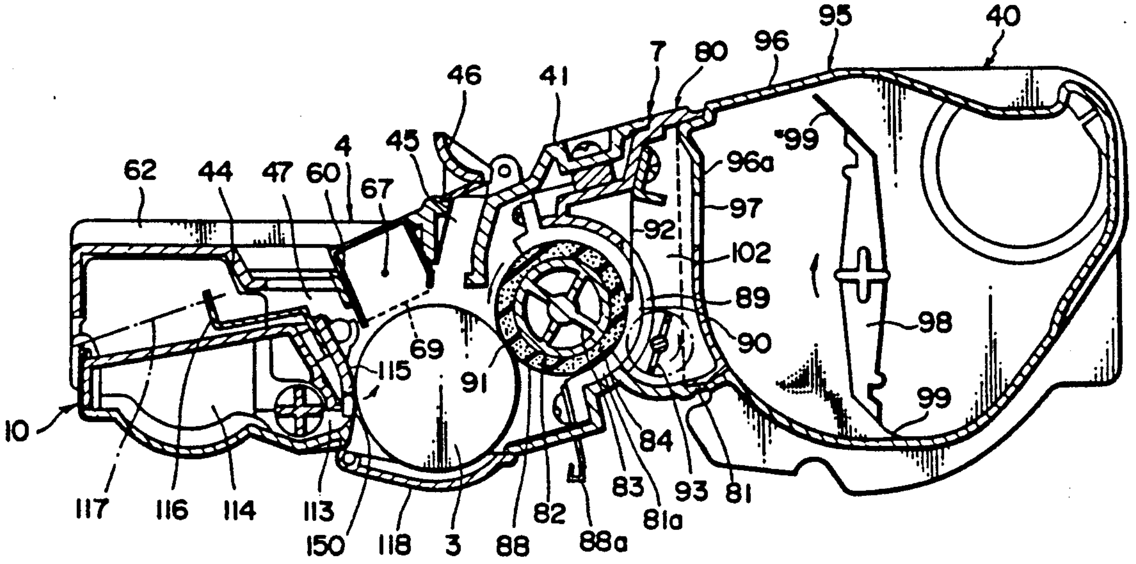
FIG. 4 is a sectional view of an image-forming unit of the embodiment.
Figure 5:
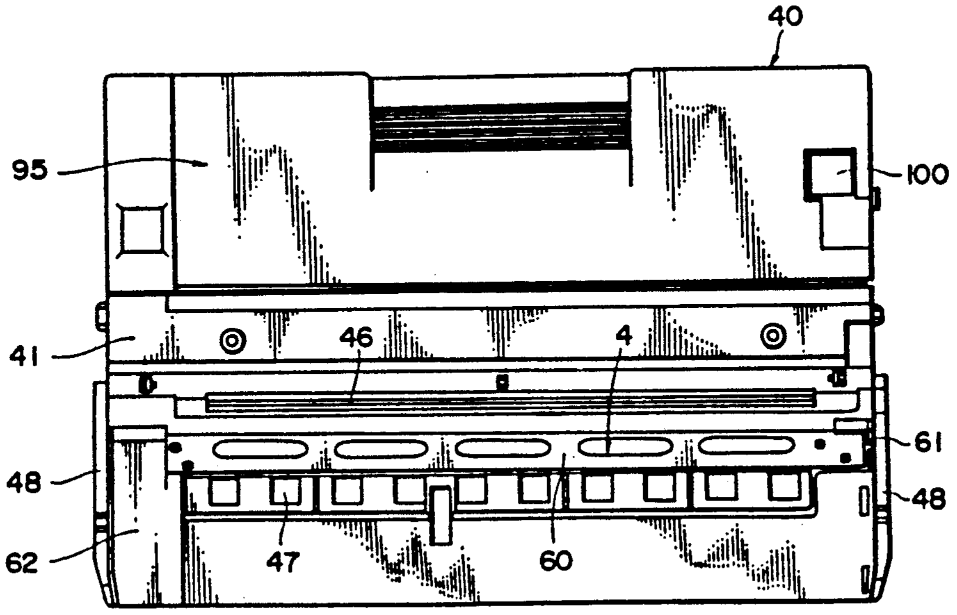
FIG. 5 is a plan view of the image-forming unit.
Figure 7:
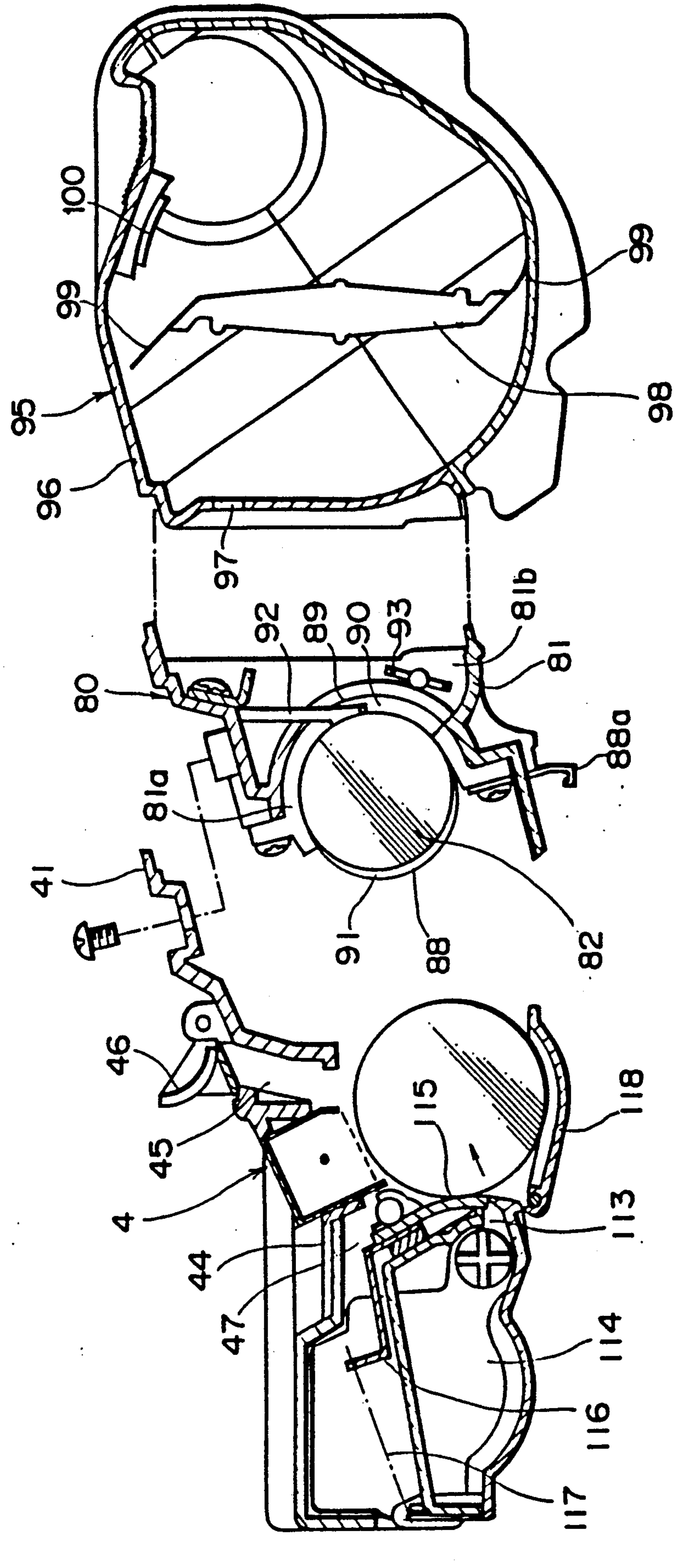
FIG. 7 is an exploded sectional view of the image-forming unit.

(v) cleaning device 10 (referring to FIGS. 4, 6, and 7)

The cleaning device 10 includes an unnecessary toner accommodating box 114 having an opening 113 at a position confronting with the drum 3, a cleaner blade 115 arranged near the opening 113, and a seal member 150 consisting of a film element made of material such as urethane. The cleaner blade 115 and an attaching member 116 supporting the cleaner blade 115 are urged by a spring 117 in a direction shown by an arrow in FIGS. 4 and 7. The spring 117 is not set in the urging state when the cleaning device 10 is not used. Once the cleaning device 10 is attached to the unit body 41, a releasing member 151 allows the spring 117 to be set in the urging state in correspondence with the opening operation of the upper unit 21, and thereafter, the urging state is maintained.. A cover 118 is attached to the cleaning device 10 to cover the bottom surface of the drum 3.

The cleaning device 10 is attached to the unit body 41 on the opposite side to the developing device 7 through the drum 3 and then is fixed to the side frames 43 of the unit body 41 by positioning pins 119.

D. image-forming unit attaching portion

As described above, the drum 3, the charger 4, the developing device 7, and the cleaning device 10 are unitedly attached to the unit body 41 to form the image-forming unit 40. The unit 40 is detachably attached to an image-forming unit attaching portion 120 arranged at the upper unit 21 as shown in FIG. 2.

The image-forming unit attaching portion 120 is generally constructed by two frames 121. One of the frames 121 is not shown in the drawings.

Each frame 121 is pivotably supported by each side frame 23 of the upper unit 21 by a shaft 122. Two pins 123 and 124 are arranged at the frame 121. These pins 123 and 124 are respectively inserted into guide grooves 125 and 126 of the side frame 23 formed around the shaft 122 in circular arc to regulate the opening angle of the frame 121. Guides 127 are respectively formed at positions confronting with the frames 121.

The image-forming unit 40 is attached to the upper unit 21 held in the opening state in such a manner that the guides 48 arranged at the side frames 43 of the unit body 41 are inserted between the frames 121 while the guides 48 move along the guides 127. In this attachment, engaging portion (not shown) arranged at one of the frames 121 causes the exposure slit 45, with the result that the slit 45 is the exposure slit 45, with the result that the slit 45 is opening and connected with the exposure slit 31 of the optical unit 5 as shown in FIG. 1.

The upper unit 21 to which the image-forming unit 40 has been attached is closed in the direction shown by the arrow (b') in such a manner that the pin 28*b* is removed from the engaging portions 29*a*, 29*b*, and 29*c* of the guide groove 29 while handling the arm 27 of the open holding mechanism 26.

At this closing operation, according to the closing operation of the upper unit 21, the image-forming unit 40 firstly contacts with the lower unit 20, and then the upper unit 21 is closed over the lower unit 20. Thereafter, the image-forming unit 40 is attached to both the units 20 and 21 in a regular position to move the cover 118 to a position other than a position covering the drum 3, resulting in exposure of the lower surface of the drum 3.

The lamps 35 of the eraser 32 attached to the bottom of the housing of the optical unit 5 are inserted into eraser insert holes 47 of the unit body 41, and the lamps 35 are closely confronted with the drum 3 through a space formed between the charger 4 and the cleaning device 10.

Figure 16:
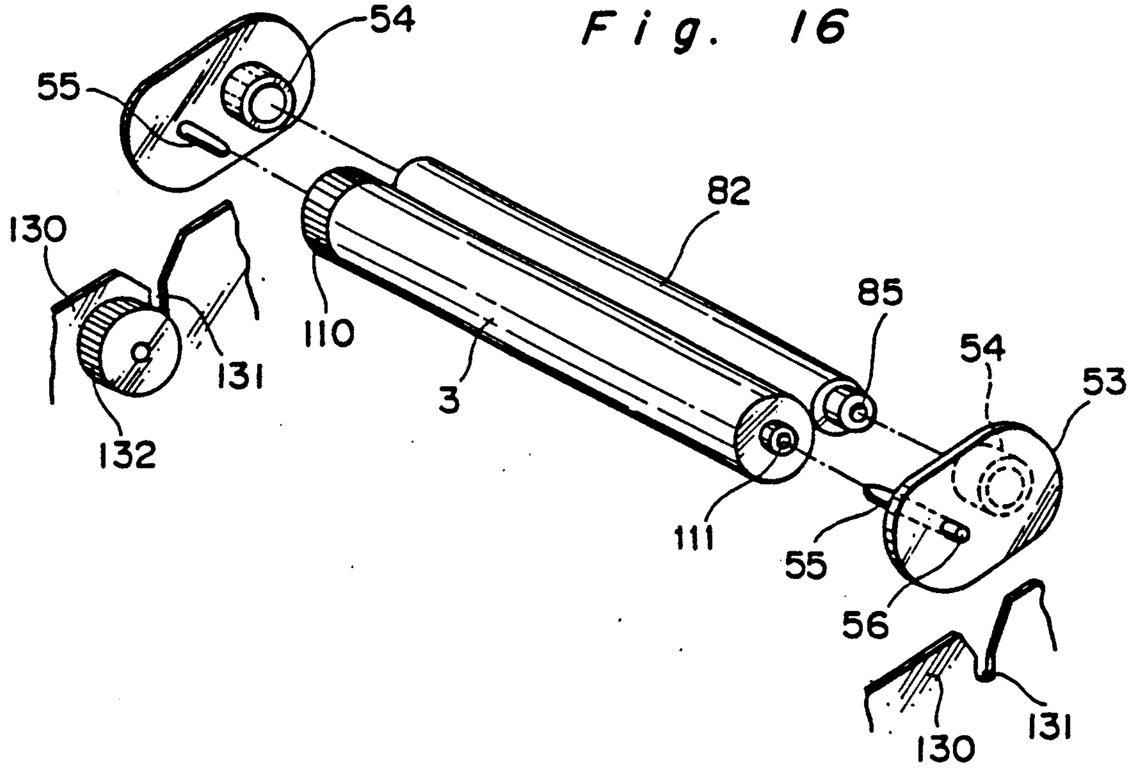
FIG. 16 is an exploded perspective view showing a state where a photosensitive member and the roller are supported by holding members.

As shown in FIG. 16, positioning projections 56 of the support shafts 55 protruding outside the holding members 53 supporting the drum 3 and the driving roller 82 drop into recesses 131 of frames 130 arranged at the lower unit 20, with the result that the holding members 53 are positioned with respect to the frames 130 of the lower unit 20. The gear 110 of the drum 3 brings in engagement with a driving gear 132 arranged at one of the frames 130 to connect the drum 3 with a driving system of the body 2. Similarly, the driving roller 82 and the agitating blades 93 and 98 are connected with the driving system of the body 2.

Thus, the holding members 53 are located on the frames 130 through the projections 56 of the support shafts 55 and the drum 3 is supported by the support shafts 55. Therefore, the drum 3 can be located on the lower unit 20 with good accuracy.

As a result, the gear 110 of the drum 3 can accurately engage with the driving roller 132 to smoothly transfer a driving force from the driving system of the body 2 to the drum 3.

Figures 8, 9:
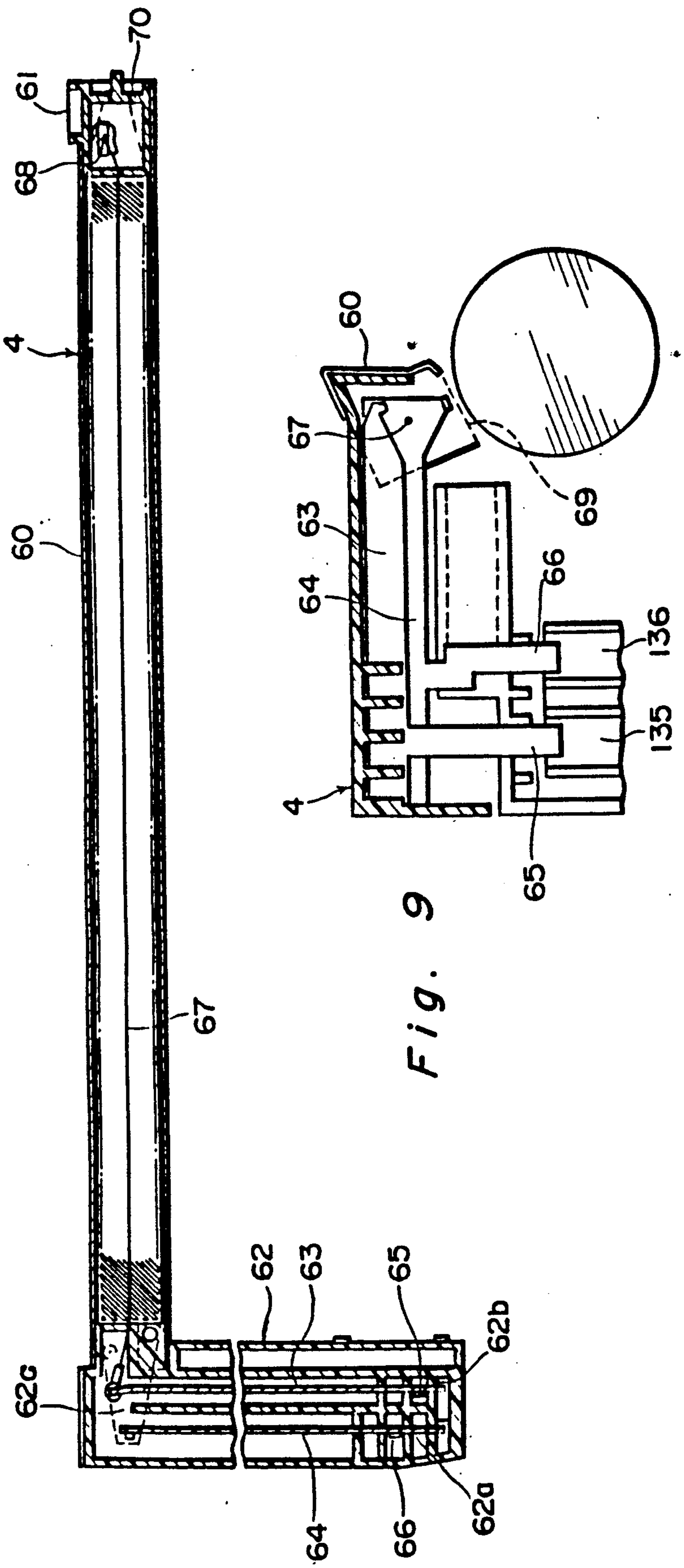
FIG. 8 is a transverse sectional view of a charger of the embodiment.
FIG. 9 is a longitudinal sectional view of the charger.
Figure 10:
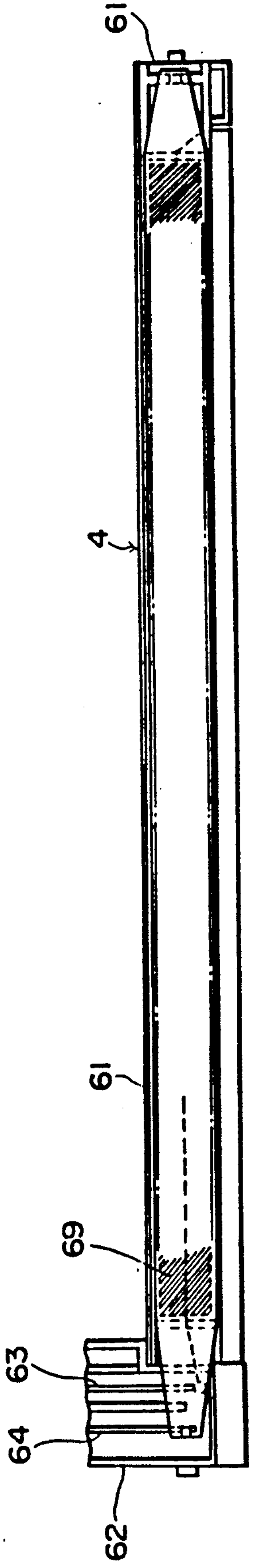
FIG. 10 is a partial bottom view of the charger.
Figure 11:
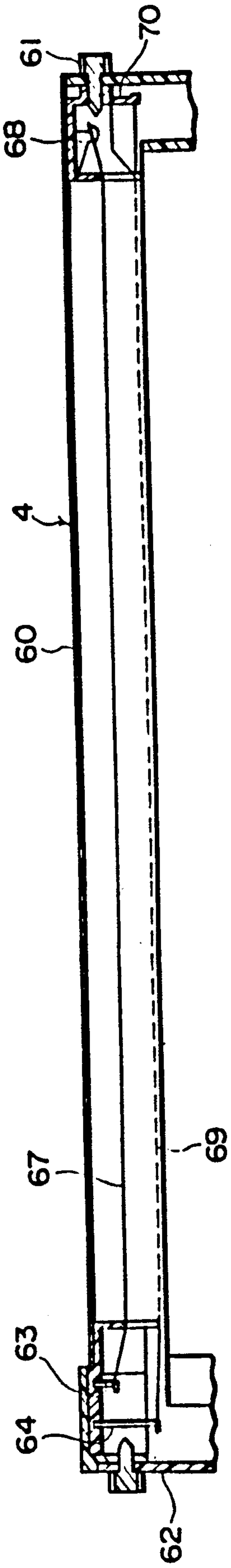
FIG. 11 is a transverse sectional view of the charger.
Figure 12:
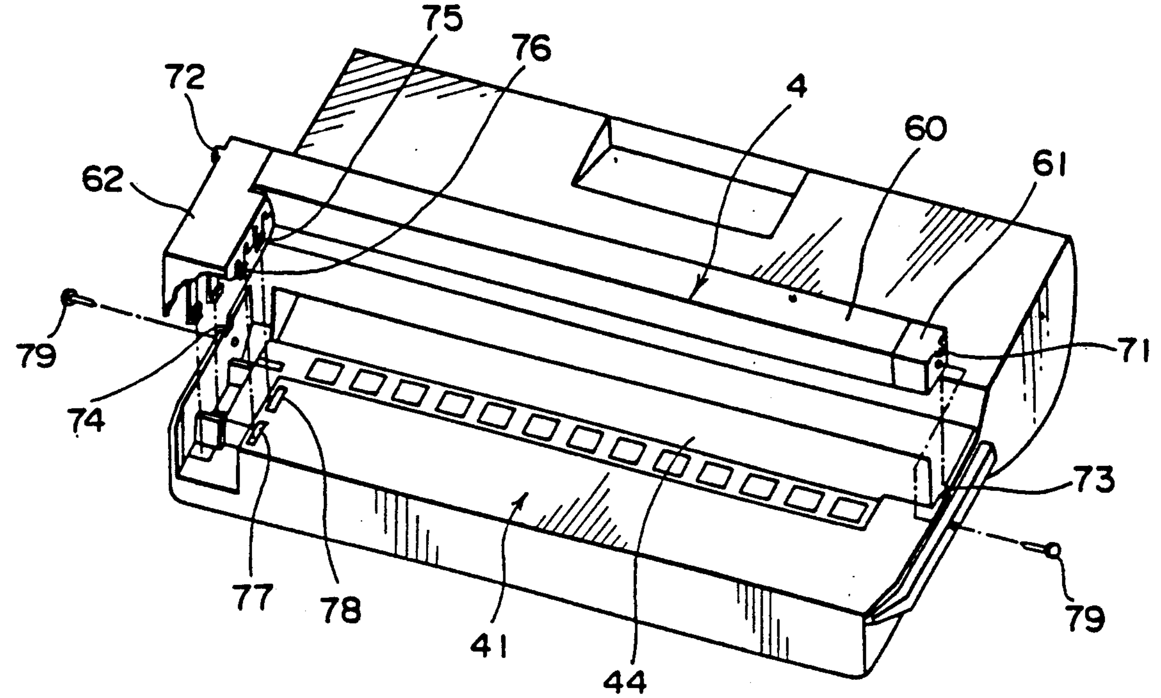
FIG. 12 is a perspective view of the charger attaching to the image-forming unit.

As shown in FIG. 9, the contacts 65 and 66 of the flat springs 63 and 64 arranged at the charger 4 are connected with electric power supply units 135 and 136 of the lower unit 20 to be capable of supplying electric power to the charger 4. Similarly, the contact 88*a* (referring to FIGS. 4 and 7) arranged at the developing device 7 is connected with an electric power supply unit (not shown) of the body 2.

As shown in FIG. 13, light receiving elements 105 of the upper unit 21 are confronted with the upper light transmission portion 100 of the hopper 95 of the developing device 7. Light emitting elements 107 of the lower unit 20 are confronted with the lower light transmission portion 101. The light receiving elements 105 arranged upward are supported by an elastic light intercepting member 106 to prevent light from entering between the light receiving elements 105 and the light transmission portion 100.

OPERATION

The operation of the printer 1 having the above-described construction will be explained hereinbelow referring to FIG. 1.

In the printer 1, the drum 3 rotates in a direction shown by an arrow (a) to be charged a specified electric potential by the charger 4. A laser beam 6 is illuminated from the optical unit 5 to the charged circumferential surface of the drum 3 charged to form an electrostatic latent image thereon according to information to be reproduced.

Sequentially, the electrostatic latent image is developed into a visible image as a toner image by the developing device 7. The toner image is transferred on a copy paper transporting from a copy paper supply unit 8 to a position confronting with a transfer charger 9.

The paper transferred the toner image is transported to a fixing device 12, and then the toner image is fixed to the paper by heat before the paper to which the toner image has been fixed is discharged to a copy paper discharge unit 13. The toner not transferred on the paper and left on the drum 3 is collected by the cleaning device 10. The electric charge left on the drum 3 is erased by light illumination of the lamps 35 of the eraser 32.

DEVELOPING OPERATION

The operation of the developing device 7 will be explained hereinbelow referring to FIG. 4.

The toner in the buffer space 102 is forcedly transported toward the driving roller 82 by clockwise rotation of the agitating blade 93.

In the other hand, the driving roller 82 rotates counterclockwise and the thin film member 88 rotates counterclockwise with the driving roller 82 by frictional contact between the tin film member 88 and the driving roller 82. The toner in the buffer space 102 adheres to the surface of the thin film member 88 by contact and static electricity force between the thin film member 88 and the toner. The toner adhered is transported with the thin film member 88 counterclockwise. Then, the toner is unitedly coated to form a thin film on the member 88 by the contact portion of the regulating plate 92 and is positively or negatively charged with the friction therebetween.

The toner passed an area contacting with the contact portion of the regulating plate 92 under pressure is moved with the thin film member 88 to transport to a position confronting with the drum 3. Then, according to electric field based on the electric potential difference between the surface potential of the drum 3 and a bias voltage applied on the thin film member 88 through the contact 88*a*, the toner is moved on the electrostatic latent image formed on the surface of the drum 3 to form the toner image.

Here, the thin film member 88 contacting with the drum 3 has the space 91 between the driving roller 82 and the thin film member 88 and thus the thin film member 88 is not contacted with the driving roller 82. Therefore, the member 88 softly and unitedly contacts with the drum 3 by only its rigidity at a suitable nip width thereof while spacing at specified intervals between the member 88 and the roller 82, with the result that the toner allows the electrostatic latent image on the surface of the drum 3 to unitedly form the toner image.

The toner left on the thin film member 88 without moving to the drum 3 is sequentially transported with the thin film member 88 and fresh toner is supplied to the member 88, having the left toner, at the buffer space 102 again to repeat the above-described operation.

According to the above-described construction, when the toner in the buffer space 102 is consumed, the corresponding amount of fresh toner to the amount of the consumed toner is replenished from the hopper 96 through the opening 97 to the buffer space 102 on the basis of clockwise rotation of the agitating blade 98.

On the other hand, as shown in FIG. 13, at areas above and under the hopper 96, light is emitted from the plural light emitting elements 107 arranged at the lower unit 20 into the hopper 96 through the light transmission portion 101 and then the light emitted into the hopper 96 is detected by the light receiving elements 105 arranged at the upper unit 21 through the light transmission portion 100.

In the hopper 96, the rotation of the agitating blade 98 causes the cleaning members 99 to rotate to simultaneously clean the inner surfaces of the upper and lower light transmission portions 100 and 101 so as to scrap off the toner adhered to the inner surfaces thereof.

Therefore, when the amount of the toner in the hopper 96 is reduced and then the hopper 96 is approximately empty, the cleaning members 99 scrap off the toner adhered on the surfaces of the light transmission portions 100 and 101 before light emitted from the light emitting elements 107 is detected in a given time period by the light receiving elements 105 through the portions 100 and 101 cleaned by the cleaning members 99. The time of period for detecting is longer in correspondence with reduction of the toner. A control device (not shown) samples output signals of the light receiving elements 105. When it is judged in a given time period by the control device that a state where light is detected by the light receiving elements 105 continues, an empty lamp (not shown) arranged at the body 2 is turned on to inform an user of a toner empty state.

A memory with respect to the toner empty state is reset when the upper unit 21 is opened, and after the upper unit 21 is closed, a specified time of period elapses before the sampling operation starts.

Since the plural light emitting elements 107 are arranged, even if there are errors in attaching position and angle of the image-forming unit 40, light emitted from the light emitting elements 107 is certainly detected by the light receiving elements 105.

The outer surface of the upper light transmission portion 100 is located slightly inside the outer surface of the hopper 96 to be capable of preventing any damage in attaching the portion 100 to the upper unit 21 and uneven clean. The outer surface of the lower light transmission portion 101 is located at approximately the same surface as the bottom surface of the hopper 96 and the inner surface of the portion 101 slightly protrudes inside the inner surface of the hopper 96 to be capable of certainly contacting with the cleaning members 99 under pressure for even clean and detecting the tone empty state with good accuracy. These light transmission portions 100 and 101 are arranged while approximately equally spaced from the rotary center (P) of the agitating member 98 and are evenly cleaned by the cleaning members 99.

The light transmission portions 100 and 101 can have lens-shape to collect the light emitted from the light emitting elements 107 so as to illuminate the light receiving elements 105.

In a case where a copy paper passes just under the hopper 95, the light emitting elements 107, the light receiving elements 105, and the light transmission portions 100 and 101 are preferably arranged outside a passage of the paper.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image-forming apparatus comprising:
   - a photosensitive member;
   - a developing means for supplying developer on an electrostatic latent image on said member to develop it;
   - a developer accommodating means for accommodating the developer to be supplied to said developing means, said accommodating means having a housing of which a first and second windows made of transparent members are arranged at a ceiling and a bottom;
   - a cleaning means for periodically cleaning the first and second windows; and
   - a detecting means having a light emitting means arranged outside the housing and confronting with one of the windows, through which light emitted from the light emitting means is illuminated, and a light receiving means arranged outside the housing and confronting with the other of the windows, which receives the light emitted from the light emitting means to detect an amount of the developer in the housing.

2. An image-forming apparatus as claimed in claim 1, further comprising an agitating means arranged in the housing and agitating the developer in the housing, wherein said cleaning means is attached to said agitating means.

3. An image-forming apparatus as claimed in claim 1, wherein said developing means and said accommodating means are attached to a body of the image-forming apparatus to be capable of detaching them in a united form, and said detecting means is attached to the body.

4. An image-forming apparatus comprising:

an image-forming unit having, at least, a photosensitive member; a developing means for supplying developer on an electrostatic latent image on the member for development; a developer accommodating housing for accommodating the developer, the housing having a first and second windows made of transparent members respectively arranged at a ceiling and a bottom; and a cleaning means for periodically cleaning the first and second windows, said unit being detachably attached to a body of the apparatus; and a detecting means having a light emitting means arranged at the body and confronting with one of the windows, the light emitting means emitting light through the one of the window into the housing; and a light receiving means arranged at the body and confronting with the other of the windows, the light receiving means receiving the light emitted from the light emitting means through the other of the windows to detect an amount of the developer in the housing.

5. An image-forming apparatus as claimed in claim 4, further comprising an agitating means arranged in the housing and agitating the developer in the housing, wherein the cleaning means is attached to said agitating means.

6. An image forming apparatus comprising:

a photosensitive member;

a developing means for supplying developer on an electrostatic latent image on said member;

a developer accommodating means for accommodating the developer to be supplied to said developing means, said accommodating means having a housing which includes a first and a second window made of transparent members, wherein said first window is arranged at a first part of the housing and the second window is arranged spaced from said first part at the housing;

a cleaning means for cleaning the first and second windows; and a detecting means having a light emitting means arranged outside the housing and confronting with one of the windows to illuminate light from the light emitting means therethrough, and a light receiving means arranged outside the housing and confronting with the other of the windows, said light receiving means receiving the light emitted from the light emitting means to detect an amount of the developer in the housing.

7. An image forming apparatus as claimed in claim 6, wherein said cleaning means is provided inside of said housing and cleans said windows by wiping movement.

8. An image forming apparatus as claimed in claim 7 further comprising an agitating means arranged in the housing and agitating the developer in the housing, wherein said cleaning means is attached to said agitating means.

9. An image forming apparatus as claimed in claim 6, wherein at least said developing means, said accommodating means, and the photosensitive member are detachably attached to a body of the image forming apparatus as a unit, and said detecting means is attached to the body.

10. An image forming apparatus for forming an image, comprising:

a developing means for supplying developer to form the image;

an accommodating means for accommodating the developer to be supplied to said developing means, said accommodating means having a housing which includes a first and a s econd window made of transparent members, wherein said first window is arranged at a first part of the housing and the second window is arranged spaced from said first part at the housing;

a cleaning emans for periodically cleaning the first and second windows; and a detecting means having a light emitting means arranged outside the housing and confronting with one of the windows to illuminate light from the light emitting means therethrough, and a light receiving means arranged outside the housing and confronting with the other of the windows, said light receiving means receiving the light emitted from the light emitting means to detect an amount of the developer in the housing.

11. An image forming apparatus as claimed in claim 10, wherein said cleaning means is provided inside of said housing and cleans said windows by wiping movement.

12. An image forming apparatus as claimed in claim 11, further comprising an agitating means arrange in the housing and agitating the developer in the housing wherein said cleaning means is attached to said agitating means.

* * * * *